INVENTOR.
Julius G. Winkler
BY
Roberts, Cushman & Grover
ATT'YS

April 25, 1967  J. G. WINKLER  3,315,317
MOLD ASSEMBLY FOR INJECTION MOLDING OF BOTTOMS TO SHOES
Filed Sept. 28, 1965  2 Sheets-Sheet 2

United States Patent Office 3,315,317
Patented Apr. 25, 1967

3,315,317
MOLD ASSEMBLY FOR INJECTION MOLDING
OF BOTTOMS TO SHOES
Julius G. Winkler, Lexington, Mass., assignor to International Vulcanizing Corporation, Waltham, Mass., a corporation of Massachusetts
Filed Sept. 28, 1965, Ser. No. 490,974
11 Claims. (Cl. 18—42)

This invention relates to molds for use in shoe manufacture to form the bottom of a shoe by injection molding.

It is customary to form the bottoms of shoes of this kind by double injection, that is, to form a first or inner layer of one kind of elastomer with the sole plate raised at which time the injection is made through an injection passage in the side ring directly into the mold cavity between the bottom of the last and the top of the sole plate, and then after the injected elastomer has set to lower the sole plate and inject a second or outer layer through a passage in the sole plate which enters the cavity through the upper surface of the sole plate. During the first injection the passages in the sole plate are open, although not supplied with elastomer and hence the elastomer injected through the side ring into the mold cavity during the first injection can flow into the open ends of the passages and solidify so as to block the open ends and thus prevent flow through these passages into the mold cavity during the second injection. To prevent such blocking it is customary to place a small piece of scrap material or a specially prepared cap or plug over or in the injection openings in the sole plate; however this requires that at each operation the molder stop long enough to find an appropriate piece or pieces and place them over or into the passages and more often than not he will neglect to do this.

The principal objects of this invention are to provide means for automatically covering the open ends of the passages in the sole plate during the first injection without the operator having to take any action whatever; to provide means which will cover the open ends of the passages as a consequence of moving the several parts of the mold assembly into position for injection; and to provide means which will not add materially to the cost of the mold assembly, will not interfere with normal molding operation, will not leave a scar or other objectionable blemish on the finished shoe, is simple, durable and trouble-free.

As herein illustrated, the foregoing is achieved by parts mounted on the bottom of the last which project therefrom into engagement with the open ends of the passages in the sole plate when the latter is in the raised position for injection of the inner or first layer, which means is yieldable to effect a tight seal between their ends and the openings in the sole plate. The parts may be comprised of silicone rubber or its equivalent, mounted at the bottom of the last, which is sufficiently yieldable to compensate for irregularities of alignment and to effectively prevent flow of the elastomer into the open ends of the passages during the first injection by contact with the surface of the sole plate around the openings or by penetration into the passages. In another form, the part comprises one or more pins or rods supported at the bottom of the last for movement relative to the sole plate and yieldably held engaged with the sole plate when the latter is in its raised position by spring means disposed behind them. Preferably the end of each pin or rod is faced with silicone rubber. Each pin or rod is supported within a recess in the bottom so that its axis coincides with the axis of the passage in the sole plate; however, it may be supported with its axis perpendicular to the bottom of the last. To prevent access of the elastomer into the recess behind the pin a sleeve or ferrule is set tightly into the recess. The ferrule contains a hole through which the pin is slidable, the pin has on it at its inner end a flange engageable with the inner end of the sleeve or ferrule and a spring is mounted in the recess behind the pin so as to normaly hold it extending from the last. There will of course be as many pins as there are injection openings in the sole plate.

The invention will now be described in greater detail with reference to the accompanying drawings wherein.

Figure 1:
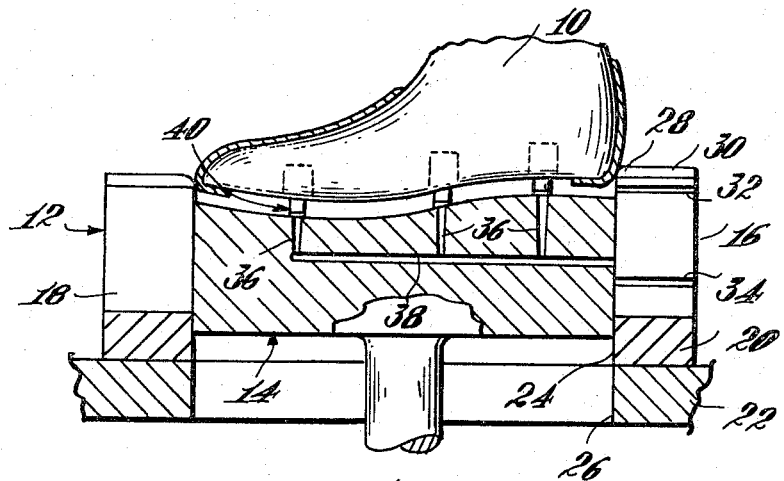
FIG. 1 shows a conventional mold assembly with the sole plate in its raised position for injection through the mold ring to form a first or inner layer and shows a plurality of pins projecting from the bottom of the last with their lower ends covering the open ends of the passages in the sole plate to prevent the elastomer from flowing into these passages during the first injection.

Referring to the drawings (FIG. 1), there is shown a mold assembly comprising a last 10, a side ring 12 and a sole plate 14. The side ring 12 is made up of two halves 16—16, divided medially of the length of the last, having interfaces 18. The two halves 16—16 are supported for movement from positions of engagement during injection to positions away from each other for removal of the finished shoe, upon supports 20 and 22. The supports 20 and 22 contain openings 24 and 26 through which the sole plate 14 is movable relative to the bottom of the last, the latter being supported at the top of the side ring by a lip 28 formed on flat plates 30—30 fastened to the tops of the ring halves 16—16.

Figure 2:
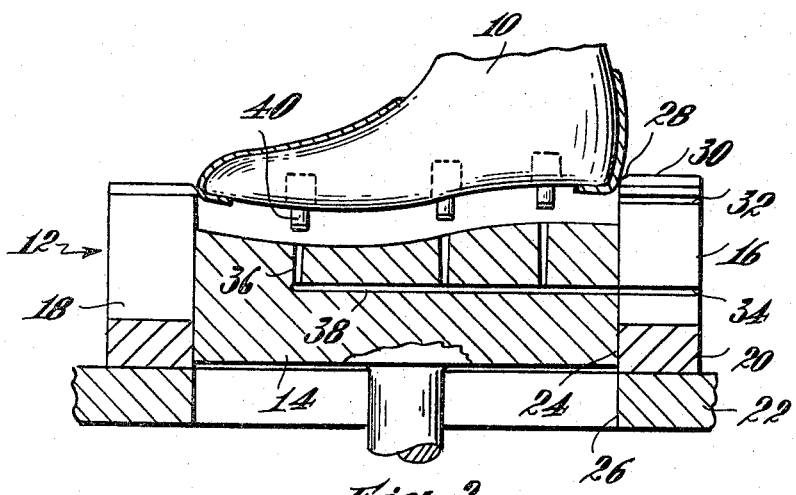
FIG. 2 shows the mold assembly with the sole plate lowered for the second injection with the ends of the passages uncovered.

The ring contains two injection openings 32 and 34 through which an elastomer may be injected. The passage 32 is in direct communication with the mold cavity between the bottom of the last and the upper surface of the sole plate when the latter is in its raised position, as shown in FIG. 1, to permit injection of an elastomer into the cavity to form a first or inner layer. The sole plate has in it injection passages 36 of which there are three shown which enter the cavity through the upper surface of the sole plate and these are adapted to be connected by a passage 38 to the injection passage 34 in the side ring when the sole plate is lowered to the position shown in FIG. 2 to enable injection of elastomer to form a second or outer layer.

Figure 3:
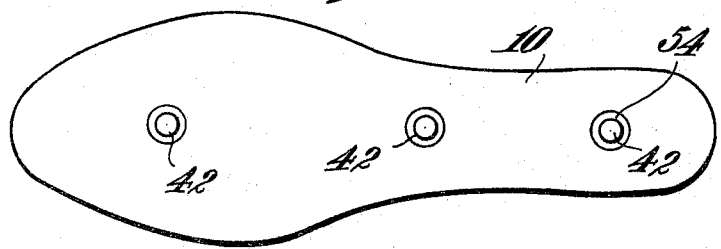
FIG. 3 shows the bottom of the last with the pins situated in spaced relation lengthwise of the bottom.

It is evident that if the upper ends of the passages 36 should be left open during the first injection the elastomer injected into the mold cavity would flow into these open ends, set and thus block the passages and prevent injection of elastomer through them for the second injection. In accordance with this invention the upper ends of the passages 36 are covered automatically by the mere movement of the parts of the mold assembly into position for making the first injection by yieldable parts 40 mounted at the bottom of the last which yieldably engage the upper surface of the sole plate when the latter is in its raised position. These parts 40 are so positioned on the last that they cover or project into the openings 36 and preferably they are so positioned that their axes are aligned with the axes of the injection openings. Three parts 40 are shown (FIG. 3) arranged medially of the bottom, one at the forepart, one at the shank and one at the heel end.

Figure 4:
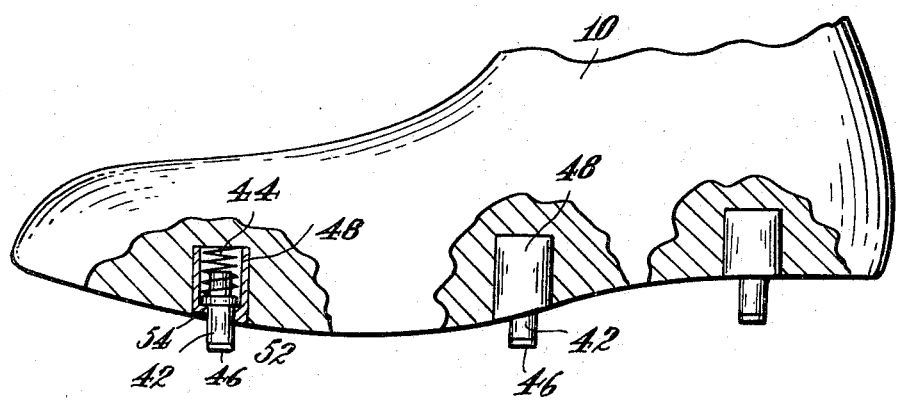
FIG. 4 is an elevation of a last sectioned in part to show pins and pin mountings in elevation and in section and so positioned that their axes coincide with the axes of the injection openings in the sole plate.
Figure 5:
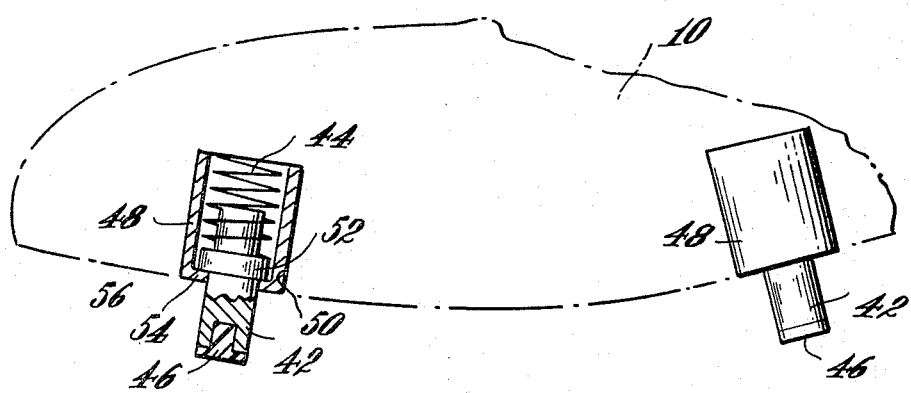
FIG. 5 is a fragmentary section showing pins in elevation and in section with their axes substantially perpendicular to the bottom of the last where they are situated.

As illustrated in FIG. 4, each of these parts 40 comprises a slender pin or rod 42 mounted at the bottom of the last with a spring 44 behind it which holds it extended from the bottom but which will permit the pin to yield as the sole plate is moved into its upper position. To compensate for slight irregularities, misalignment and the like, and to provide a close seal, the lower end of each pin is faced with a cap 46 of silicone rubber which, as shown in FIG. 5, is recessed into the end of the pin. The silicone cap provides just enough resilience and/or elasticity to effect a seal even though the edge around the opening at the surface of the sole plate is not perfectly flat or may be at a slight angle to the end of the pin. The pin is supported in the last, as shown in FIGS. 4 and 5, by a sleeve 48 set into a hole 50 bored in the bottom of the last and has an opening 52 at its lower end surrounded by a flange 54. The pin is freely slidable through the opening 52 and has on it a shoulder 56 which is located above the flange and by engagement with the flange limits extension of the pin by the spring backing it.

Figure 6:
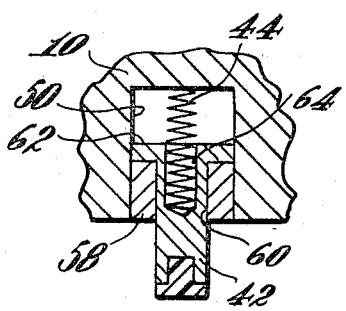
FIG. 6 is a fragmentary section through a modified form of pin and support.

Alternatively (FIG. 6), a ferrule 58 may be forced into the hold 50. The ferrule contains a hole 60 within which the pin 42 is slidably mounted. In this form the pin has at its inner end a flange 62 engageable with the inner end of the ferrule to limit the extension of the pin. The spring 44 instead of surrounding the inner end of the pin, as shown in FIG. 4, is seated in an opening 64 bored in the inner end of the pin.

As was related above, the pin is preferably so supported that its axis coincides with the axis of the injection opening; however, it may be desirable to position it at an angle thereto, as shown in FIG. 5, that is, with the axis of the pin substantially perpendicular to a tangent to the surface of the bottom of the last at the position where it is located.

Figure 7:
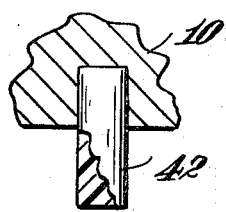
FIG. 7 is a fragmentary section of a fixed but elastic pin.

In FIG. 7 there is shown a modification in which a pin or rod 42 of silicone rubber is substituted for a spring-pressed pin and is fixed in the bottom. In this case the yieldable nature of the silicone rubber is relied upon to compensate for irregularities and to provide for movement of the sole plate to its operative position with sufficient yield to prevent the last from being lifted from its seat on the lip of the mold ring.

Figure 8:
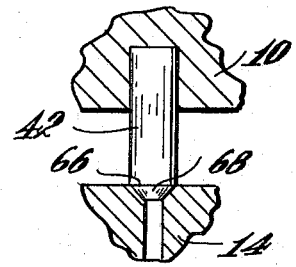
FIG. 8 is a fragmentary section of a modification in which the lower end of the pin is shaped to fit into the upper end of the confronting passage in the sole plate.

As described above, the lower ends of the pins are flat and engage the surface of the sole plate around the open ends of the injection passages. Optionally the ends of the pins may be shaped to fit into the open ends of the passages as shown in FIG. 8. Preferably the open ends of the passages would be recessed, for example, by a conical counterbore 66 and the ends of the pins would be provided with a tapered tip 68 adapted to fit into the recesses.

It should be understood that the present disclosure is for the purpose of illustration only and that this invention includes all modifications and equivalents which fall within the scope of the appended claims.

I claim:

1. A mold assembly for injection molding comprising a last, a side ring and sole plate, said sole plate being movable relative to the bottom of the last and containing an injection passage through its upper surface, said side ring containing two injection passages, one of which is adapted to permit injection when the sole plate is raised to form an insole layer and the other of which is adapted to permit injection through the passage in the sole plate when the latter is lowered to permit injection of an outsole layer, and means operable to cover the passage through the sole plate during injection through the side ring to form the inner layer when the sole plate is raised, comprising a yieldable part mounted at the bottom of the last in confronting relation to the injection passage in the sole plate, said part being long enough to have yielding engagement with the open end of the passage in the sole plate when the latter is raised to prevent entry of an elastomer into the injection passage from the mold cavity.

2. A mold assembly according to claim 1, wherein there are one or more passages in the soleplate and a corresponding number of parts mounted at the bottom of the last, one confronting the open end of each passage in the sole plate.

3. A mold assembly for injection molding comprising a last, a side ring and a sole plate, said sole plate being movable relative to the bottom of the last and containing one or more injection passages through its upper surface, said side ring containing two injection passages, one of which is adapted to permit injection when the sole plate is raised to form an insole layer and the other of which is adapted to permit injection through the passage in the sole plate when the latter is lowered to permit injection of an outsole layer, and means operable to cover the open end of each passage through the sole plate during injection through the side ring to form the inner layer with the sole plate raised, comprising a yieldable part comprised of a material unaffected by the temperature of the elastomer at its temperature of injection mounted at the bottom of the last in confronting relation to the open end of each injection passage in the sole plate, said part being long enough to have yielding engagement with the open end of the injection passage and to prevent entry of the elastomer thereinto from the mold cavity.

4. A mold assembly for injection molding comprising a last, a side ring and a sole plate, said sole plate being movable relative to the bottom of the last and containing one or more injection passages through its upper surface, said side ring containing two injection passages, one of which is adapted to permit injection when the sole plate is raised to form an insole layer and the other of which is adapted to permit injection through the passage in the sole plate when the latter is lowered to permit injection of an outsole layer, and means operable to cover the open end of each passage through the sole plate during injection through the side ring to form the inner layer with the sole plate raised, comprising a yieldable part of silicone rubber mounted at the bottom of the last with its lower end in confronting relation to the open end of each injection passage in the sole plate, said part being long enough to have yielding engagement with the sole plate at the open end of the passage therein when the latter is raised to prevent entry of elastomer into the injection passage from the mold cavity.

5. A mold assembly according to claim 4, wherein the lower end of each part is dimensioned to fit into the open upper end of the confronting passage.

6. A mold assembly for injection molding comprising a last, a side ring and a sole plate, said sole plate being movable relative to the bottom of the last and containing an injection passage through its upper surface, said side ring containing two injection passages, one of which is adapted to permit injection when the sole plate is raised to form an insole layer and the other of which is adapted to permit injection through the passage in the sole plate when the latter is lowered to permit injection of an outsole layer, and means operable to cover the passage through the sole plate during injection through the side ring to form the inner layer with the sole plate raised, comprising a part mounted at the bottom of the last for movement relative to the sole plate, and a spring recessed into the last bottom behind the part yieldably holding the part extending from the bottom in engagement with the sole plate.

7. A mold assembly for injection molding comprising a last, a side ring and a sole plate, said sole plate being movable relative to the bottom of the last and containing an injection passage through its upper surface, said side ring containing two injection passages, one of which is adapted to permit injection when the sole plate is raised to form an insole layer and the other of which is adapted to permit injection through the passage in the sole plate when the latter is lowered to permit injection of an outsole layer, and means operable to cover the passage through the sole plate during injection through the side ring to form the inner layer with the sole plate raised, comprising a slender pin mounted in the bottom of the last for movement relative to the sole plate, a spring situated behind the pin yieldably holding the pin extending from the bottom in engagement with the sole plate at the open end of the passage in the sole plate, and a silicone rubber tip fixed in the end of the pin.

8. A mold assembly according to claim 7, wherein the axis of each pin coincides with the axis of the confronting passage in the sole plate.

9. A mold assembly according to claim 7, wherein the axis of each pin is substantially perpendicular to a tangent to the bottom of the last at the place of projection from the last.

10. A mold assembly for injection molding comprising a last, a side ring and a sole plate, said sole plate being movable relative to the bottom of the last and containing an injection passage through its upper surface, said side ring containing two injection passages, one of which is adapted to permit injection when the sole plate is raised to form an insole layer and the other of which is adapted to permit injection through the passage in the sole plate when the latter is lowered to permit injection of an outsole layer, and means operable to cover the passage through the sole plate during injection through the side ring to form the inner layer with the sole plate raised, comprising a slender pin at the bottom of the last yieldably engaged with the sole plate, a sleeve recessed into the bottom of the last, said sleeve having a flanged opening through which the pin is slidable, said pin having a shoulder inwardly of said flange engageable therewith to limit extension of the pin, and a spring behind the pin yieldably holding the pin extended with the shoulder engaged with the flange.

11. A mold assembly for injection molding comprising a last, a side ring and a sole plate, said sole plate being movable relative to the bottom of the last and containing an injection passage through its upper surface, said side ring containing two injection passages, one of which is adapted to permit injection when the sole plate is raised to form an insole layer and the other of which is adapted to permit injection through the passage in the sole plate when the latter is lowered to permit injection of an outsole layer, and means operable to cover the passage through the sole plate during injection through the side ring to form the inner layer with the sole plate raised, comprising a slender pin at the bottom of the last, said last containing a recess, a ferrule seated in the entrance to the recess through which the pin is slidable, a flange on the pin inwardly of the ferrule engageable with the inner end of the ferrule to limit outward movement of the pin, and a spring situated behind the pin with one end recessed into the inner end of the pin.

References Cited by the Examiner
UNITED STATES PATENTS

| | | | |
|---|---|---|---|
| 2,878,523 | 3/1959 | Hardy | 18—17 X |
| 3,014,242 | 12/1961 | Baker et al. | 18—17 X |
| 3,031,722 | 5/1962 | Gits | 18—42 X |
| 3,109,199 | 11/1963 | Hardy | 18—30 |
| 3,160,921 | 12/1964 | Ludwig | 18—42 |
| 3,164,864 | 1/1965 | Kobayashi | 249—105 |

J. SPENCER OVERHOLSER, *Primary Examiner.*

J. HOWARD FLINT, JR., *Examiner.*